July 15, 1969 A. B. MASON ET AL 3,455,772
NON-WOVEN REINFORCED BLOWN RUBBER UNDERPAD
Filed Aug. 18, 1964 2 Sheets-Sheet 1

INVENTORS:
AUSTIN B. MASON
ROBERT C. WILKIE
BY,
Russell, Chittick, & Pfund
ATTORNEYS

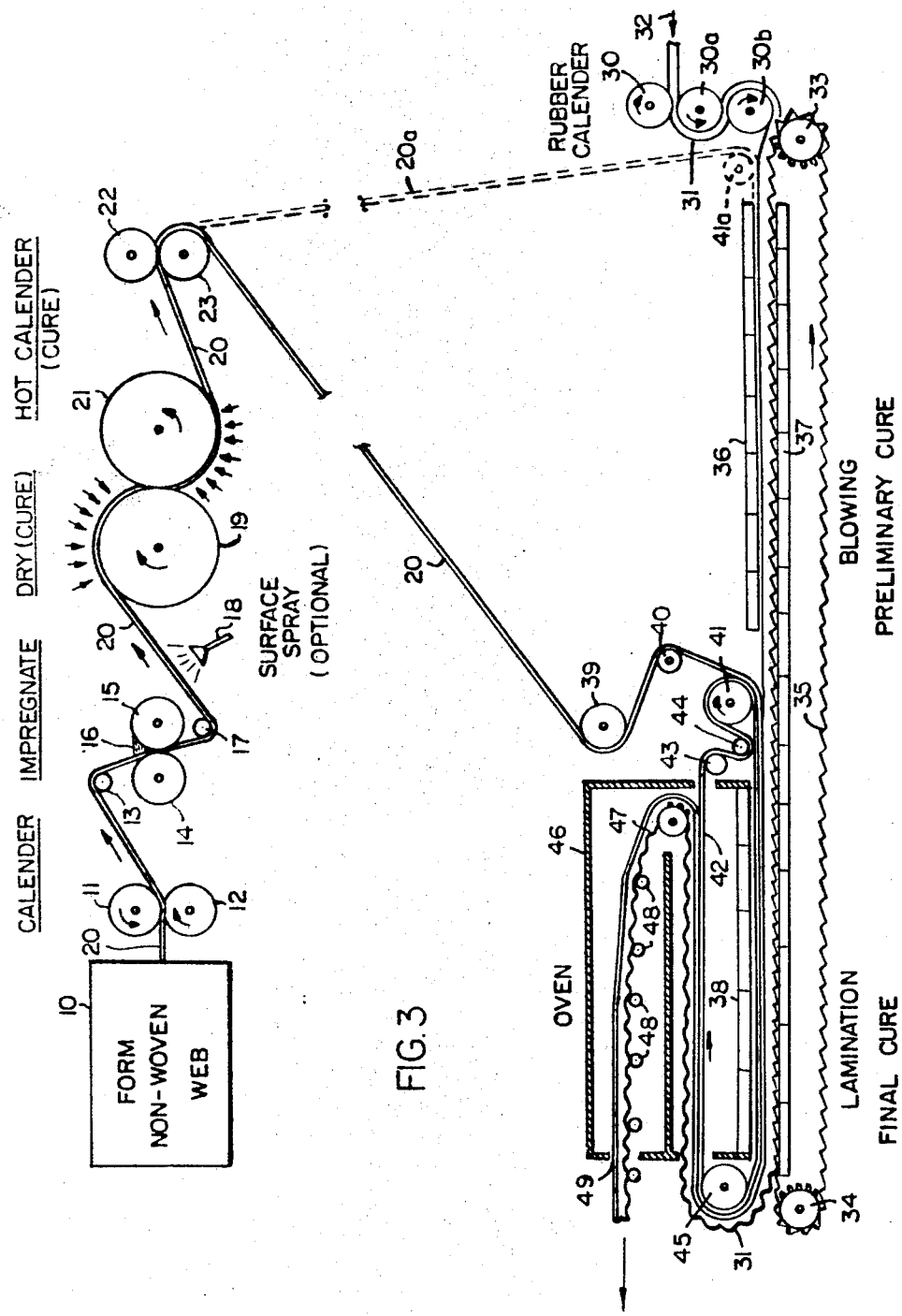

United States Patent Office 3,455,772
Patented July 15, 1969

3,455,772
NON-WOVEN REINFORCED BLOWN RUBBER UNDERPAD
Austin B. Mason, Concord, and Robert C. Wilkie, Millis, Mass., assignors to Ludlow Corporation, Needham Heights, Mass., a corporation of Massachusetts
Filed Aug. 18, 1964, Ser. No. 390,407
Int. Cl. B32b 5/18, 11/02
U.S. Cl. 161—122                         2 Claims

ABSTRACT OF THE DISCLOSURE

A multidirectional dimensionally stable reinforced sponge rubber carpet underlay comprised of a layer of sponge or blown elastomer which preferably has a multiplicity of formed bulges or contours and intimately bonded thereto an essentially isotropic non-woven fabric consisting of uniformly blended synthetic fibers impregnated with 7 to 25 weight percent of a fused thermoplastic binder. The side of the non-woven contacting the rubber layer is smooth and compacted relative to the balance of the web and the fused thermoplastic binder is compatible with the rubber whereby the bond strength between the fabric and rubber is greater than the internal cohesiveness of the rubber.

The fabric preferably consists of a predominate proportion of viscose rayon fibers and from 3 to 30 weight percent polypropylene fibers.

---

This invention pertains to an improved carpet underlay or underpad and more particularly to a carpet underpad consisting of a layer of a sponge rubber having firmly bonded thereto a reinforcing layer of a non-woven fabric of special construction.

This invention is concerned with the carpet underlay of the type shown in U.S. Patent 2,740,739 (Harwin et al.). The underlay disclosed in this patent consists of a configured blown rubber layer reinforced on one side with a scrim or a relatively open mesh fabric. The scrim is placed on the sponge rubber layer during the blowing of the rubber such that portions of the sponge bulge up and through the scrim mechanically locking and holding it in place. While this type of underlay has had considerable commercial acceptance because of its favorable price and general performance, it nevertheless has several undesirable features that could be eliminated to make a more satisfactory product.

The bond between the scrim and the sponge rubber is largely a mechanical one even though a bridging adhesive may be used. This poor bond quite often results in delamination. The underlay has stability in only two dimensions consistent with the manner in which the scrim is woven (warp and filling wise). It must therefore be handled consistent with the directional characteristics of the scrim. A scrim reinforced pad can theoretically be pulled in two directions but because of the biased lamination of the scrim to the rubber any directional strain usually results in delamination. Because of its poor handling characteristics, the scrim usually bonds with the rubber pad on the bias. In a scrim reinforced underpad, the scrim lends no compression or push stability to the product. The open structure of the scrim permits dirt or dust to collect in the pockets of the configured sponge rubber layer. This lack of a smooth surface makes cleaning of the underlay after installation, or after the carpet has been taken up for cleaning difficult. The knobby rubber surface of the underlay which protrudes above the scrim hinders the sliding and smoothing of the carpet over the underlay. The underlay also accepts stapling poorly and quite often permits the staples to tear out or through the underlay. Because of the unevenness of the edge and the fraying and unravelling of the scrim butt joining is accomplished with difficulty and the poor joints that often result give poor support to a carpet at this point. If pressure sensitive tape is used, with or without stapling in butt joining, the adhesion between the tape and the underlay is extremely poor because of the irregular mesh and the knobby rubber surface.

In brief compass, the present invention is multidirectional dimensionally stable reinforced sponge rubber carpet underlay that overcomes these and other problems. It consists of a layer of a sponge or blown elastomer which can be smooth but which preferably has a multiplicity of formed bulges or contours, with there being intimately bonded to one side thereof a random or semi-oriented non-woven fabric the fiber content of which consists of at least ten percent by weight of fibers of a synthetic polymer, such as polypropylene or nylon, that has a high flex resistance as determined by the Flex Cycles to Failure of Fiber Test as listed in Textile Fibers, Yarns and Fabrics by Kaswell, 1953 edition, page 57 (Reinhold Publishing Company, New York, N.Y.). The surface of the non-woven fabric contacting the rubber layer is selectively mechanically and heat smoothed and densified to improve the bond between the non-woven fabric and the rubber layer. Because of this, the resultant bond between the two is stronger than the internal cohesiveness of the sponge elastomer layer such that in attempting to separate the two layers failure of the bond occurs within the elastomer and not at the interface between the non-woven fabric and the elastomer.

One of the surprising features of this invention was the finding that contrary to expectations it is desirable to smooth and locally compact the surface of the non-woven fabric to be bonded to the rubber layer. One would expect that the unsmooth non-woven with the fibers thereof protruding in a random manner from the surface would form a much better interlock with the rubber, but this is not the case.

There are perhaps several reasons for this. The non-woven fabric is applied to the rubber layer with little or no pressure at a point where the rubber is either uncured or semi-cured. In the preferred embodiment of this invention, the non-woven is applied with a minimum amount of pressure after the rubber is fully blown. The rubber during blowing and until cured is in a very plastic state and must have freedom to expand as well as to droop on the chain grate or apron that imparts the desired bulges or contoured shape to the rubber. If pressure were applied to the rubber layer during the laminating the apron would cut through the rubber layer. Essentially, the nonwoven fabric is simply laid onto the rubber surface during the final phase of the curing of the rubber.

The non-woven can be formed by any known method as by cross-laying garnetted or carded webs, but the non-woven is preferably a random air-laid web. The non-woven as finally bonded to the rubber may have some orientation, but the ratio of the properties of the web in one direction (machine direction or cross machine direction) to the other as measured by tensile strengths should not vary more than 5:1, and preferably this ratio is less than 2:1. A ratio of 1:1 of the properties in any direction would, of course, be ideal, but is difficult to achieve in practice. The processing to which the web is subjected, i.e., the impregnating, the calendering and the heat bonding to the blown rubber, will tend to cause some orientation of the web. This potential cause of unbalance by the subsequent processing is minimized as much as possible.

In the preferred embodiment, the non-woven fabric is bonded with an adhesive, the polymer content of which is compatible with the elastomer of the sponge layer. This eliminates the need for any bridging adhesive between the non-woven fabric and the sponge rubber layer with a consequent direct savings in overall costs besides improved performance. The conditions of final curing of the sponge rubber layer causes the adhesive binder to chemically combine with the sponge rubber layer so that a good chemical bond is obtained. In this connection, the local densifying and compacting of the fabric to be adhered to the rubber layer as by hot calendering causes the fibers thereof to lay down in the plane of the surface. Besides greatly increasing the surface area of the fibers available for contacting the surface of the sponge this permits more of the adhesive binder to be at the surface for combining with the sponge rubber, i.e., if the surface is left uncompacted and somewhat hairy then there are many valleys in the surface that hold the adhesive binder away from contact with the sponge rubber layer. From the processing standpoint, a latex impregnate is preferably used as the adhesive binder.

If pressure could be used to bring the two layers together, whether or not the non-woven was hot calendered would not be as important because the rubber of the sponge could be mechanically forced to penetrate the interstices of the non-woven fabric. If pressure is used, however, the blown density of the sponge is adversely effected and when a chain apron is used to configure the sponge the pressure causes the apron to perforate the sponge.

Many fibers such as jute and glass have a very poor resistance to flexing or to the application of a shearing force transverse to the length of the fiber. Polymers such as polyester, polypropylene, polyethylene, nylon and acrylic fibers are noted for their good flex resistance. In the construction of the preferred non-woven fabric used in this invention, at least 10 percent and preferably at least 17 percent or more of the fibers of the non-woven have a length in the order of 1 to 6 inches and a denier in the range of 3 to 30 and consist of a polymer having high flex resistance, i.e., a life of at least 100,000 cycles in accordance with the above-described Flex Cycles to Failure of Fiber Test. One reason these fibers are used is to impart the requisite properties needed to permit the composite underlay to accept stapling when the underlay is being laid. Another reason is to impart resistance to the continuous severe flexing in use occasioned by women's spiked heels in high traffic areas. With an underlay of this type where the reinforcing is a non-woven made out of fibers of low extensibility and flexibility to break, stapling readily causes the fibers to shear and they consequently do not adequately hold and reinforce the rubber layer.

The underlay of this invention is preferably made of 100% synthetic polymers and regenerated cellulose fibers so that it will be verminproof, mothproof, rot resistant, and non-allergic.

The invention will become clear from the following example made with reference to the drawings attached to and forming part of this specification.

In the drawings:

FIG. 3 is a schematic illustration of one preferred process used to prepare the carpet underlay.

Figure 1:
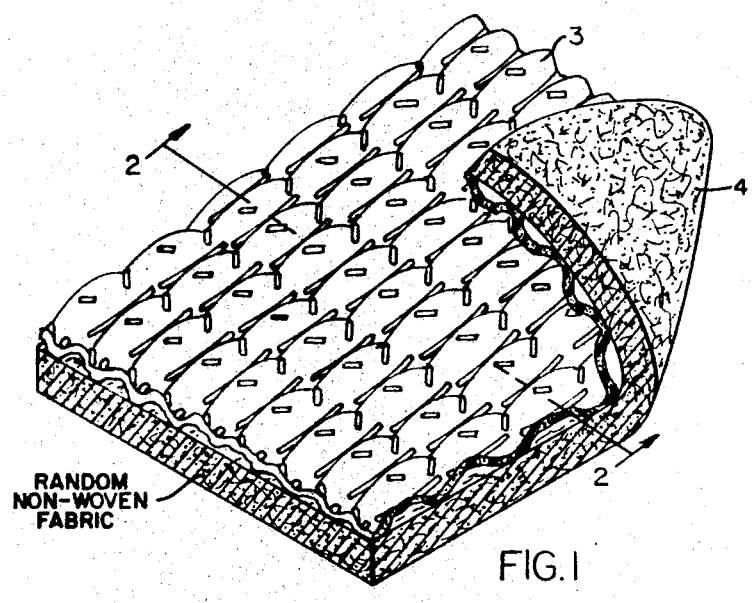
FIG. 1 is a perspective view of the carpet underlay of this invention with one corner turned back to show the bonded reinforcing non-woven fabric.
Figure 2:
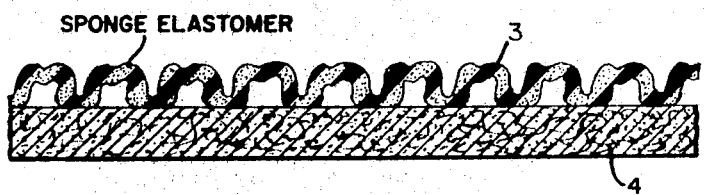
FIG. 2 is a view in cross-section of the carpet underlay taken along line 2—2 of FIG. 1.

With reference to FIGS. 1 and 2, the underlay consists of a conventional contoured, puckered or otherwise configured sponge rubber elastomer layer 3 having bonded to one side thereof a calendered non-woven fabric 4 of special construction. The overall thickness of the underlay may range from about 0.125 to 1.25 inches. Its overall weight may be in the range of 16 to 150 ounces per square yard, e.g., 25 ounces per square yard, with the non-woven fabric amounting to 5 to 20 percent thereof, e.g. 4 ounces per square yard. In the range of 7 to 25 weight percent of the non-woven fiber content can consist of the adhesive binder (dry basis).

The elastomer used to form the sponge layer can be of any conventionally known type such as natural, synthetic or reclaimed rubbers, polyvinyl chloride and copolymers, polyurethane and the like. The sponge rubber proper after blowing can have a blown density in the range of 1 to 50 pounds per cubic foot. The blowing of the elastomer can be accomplished by any technique suited to the particular elastomer system being used.

Referring to FIG. 3, as indicated by numeral 10, a non-woven web is first formed as for example with an air lay machine of the type described on pages 11 to 14 in the book, Non-Woven Fabrics by Buresh (Reinhold Publishing Corporation, New York, N.Y., 1962) which forms a random type of web. The preferred weight of the unimpregnated non-woven deposited is in the range of 1 to 9 ounces per square yard with fibers having a specific gravity of 0.96 to 2.50.

As an example, the fiber content of the web may consist of 80% of crimped viscose rayon fibers, 5½ denier per filament, dull 1 9/16" cut and 20% of polypropylene fibers 15 denier per filament, bright 3" cut. The weight of the web at this point with this fiber content can be 2.6 ounces per square yard.

Immediately after the web 20 is formed it is calendered between calendering rolls 11 and 12 both of which can be metal. Either or both of the rolls of the calender can be operated hot or cold depending on the degree of calendering desired. In this example, both are cold. The purpose of this calendering is to compress the web to reduce its air content, to densify it to some extent and to increase its cohesiveness or strength so that it may be handled and will more readily accept impregnation with the latex.

After this calendering, web 20 is passed over guide roll 13 to the impregnating step. While different types of impregnation or saturation can be used, it is preferred to use a two-roll horizontal liquid saturator, as illustrated. This type of saturator causes maximum penetration of the binder into the web structure and allows a good bit of process flexibility for handling different types of emulsions or dispersions of a variety of dry solids content. Also, the weight percent of wet pick-up can be accurately controlled.

The saturator consists of a stainless steel roll 14 with a silicone rubber roll 15 firmly pressed thereagainst by hydraulic means at the desired pressure, e.g., 240 pounds per linear inch of nip width. In this case, the roll 14 is driven and roll 15 is free turning. A pool or lake 16 of the impregnating latex is maintained in the nip between the two rolls and the web 20 passes down through pool 16 into the nip. The amount of pick-up is controlled by the amount of calendering previously given web 20, by the depth of the pool 16, by nature of the impregnating latex and by the pressure on the impregnating rolls. For the preferred type of impregnating formulated latices which have solids contents in the range of 10 to 20, e.g. 15, weight percent (dry basis), the wet pick-up is controlled to be in the range of 100 to 200 weight percent based on dry fibers. The impregnated web issues from the nip and is passed over guide roll 17 to the next step.

The impregnate or binder formulation used is preferably an emulsion or a dispersion of a thermoplastic or semi-thermoplastic polymer containing additives that assist the binder in penetrating the web and collecting at the points of fiber-to-fiber contact. Examples of suitable types of polymers that can be used in dispersions are natural rubber, neoprene and butyl. A formulation that has been found suitable is:

| | Weight percent |
|---|---|
| Latex 4634–D (at 50% dry solids) | 28 |
| Dispersant Agent 850 (at 30% dry solids) | 2 |
| Water | 70 |

The latex is a small particle size carboxylated styrene-butadiene latex containing approximately 55 to 60 percent combined styrene and 1 to 5 percent acrylic acid.

The dispersing agent is added primarily to obtain good release of the non-woven from the surface of the impregnator or saturator rolls 14 and 15 and from the surfaces of the subsequent equipment contacting it before it is dry. Without a dispersing agent the rolls tend to pick-off fibers from the non-woven.

As a result of the use of a two-roll horizontal saturator, the saturated compacted web at this point will accept surface spray painting on either or both sides, as for example by spray means 18, for decorative or functional purposes if this is desired. This is a particular advantageous feature of this process. The wet web can be surface spray coated with a suitable coloring material, such as with a pigment-binder or with a dye with a minimum penetration of the coating into the body of the web. By doing this coating at this point, only a single drying operation is required.

Web 20 is thereafter dried and if desired some curing can be carried out at this point. It is preferred to use a Fleissner-type perforated single or multi-drum air circulation type of dryer (see page 116 of the articles Non-Woven Materials, Methods, Marketing, Part VII, Textile Industry, July 1963). With the two drum dryer, the web after passing 180° around one drum with hot air flowing therethrough is transferred to a second drum with the air flow being reversed, as shown by drums 19 and 21 and the arrows indicating the direction of the air flow. The drying is preferably carried out to below or about the equilibrium moisture content of the fibers at standard atmosphere conditions. The temperature of the web during drying is maintained sufficiently below that temperature which would cause considerable fiber contraction or distortion.

The dry saturated web is then passed to a hot calendering step to impart the desired smoothness to at least one surface thereof. The hot calendering operation is carried out with two rolls 22 and 23. Roll 22 is a heated metal roll operating at a temperature in the range of 275° to 550° F., e.g., 450° F. Roll 23 is a resilient wool and cotton-filled roll, of preferably 70 to 80 Shore D Durometer, forced against the metal roll to give nip pressures in the range of 150 to 1,000 pounds per linear inch, e.g., 500 pounds per linear inch. The amount of smoothing and densification obtained on the surface of web 22 is, of course, temperature-pressure-time dependent. The conditions are selected such that there is preferably some incipient local fusing of the fibers at the surface but not sufficient fusing to materially reduce the porosity of the fabric.

Roll 22 can be an embossing type of roll to impart some shallow embossing to the web for decorative purposes without interfering with the compacting and densifying of the surface fibers, but the embossure should not be so gross or coarse as to prevent large areas of the surface from contacting the rubber layer during bonding.

The suitability of the calendering of the surface can be observed by a relatively simple "fingernail scratching" test. After the calendering step if the surface contacting the resilient roll is scratched repeatedly in one area with a fingernail it turns fuzzy and the fibers raise and become loose. If the smooth surface is scratched, however, even rather vigorously, there is no apparent loosening of the fibers. The degree of densification given the surface is not sufficient to cause any noticeable coalescence of the surface fibers so that no brittle or glossy film-like areas or spots are apparent.

The effect of the calendering, in addition to locally densifying and smoothing the surface on one side, is to compact and densify the non-woven web and greatly increase its multi-directional tensile strength while leaving in the desired stretch factor. It develops the final overall characteristics in the web required for the use of this material as a reinforcing medium for the blown rubber type of underpad. The latex binder employed is raised to its plastic state and this softening in combination with the pressure causes the latex binder to securely bond the fibers. As mentioned previously, the smoothing of the surface results in a concentration of the latex binder at the surface permitting it to chemically bond with the sponge rubber layer during the laminating step.

After calendering, web 20 is passed to the second stage of the process for lamination to the sponge rubber layer. It may at this point be passed over a cooling can (not shown) and wound up for temporary storage.

The above-described process of treating the non-woven after web formation is believed novel and useful per se for the processing of any of a variety of non-woven fabrics independently of the use to which they are to be put. Also, it will be appreciated by those skilled in the art that the particular impregnated and calendered random non-woven fabric described besides being useful in the construction of the particular underpad of this invention, is generally useful because of its unique properties as a laminating and/or reinforcing medium in the construction of other products.

The preparation of the sponge rubber layer and the lamination step are shown in the lower portion of FIG. 3. In general, the equipment consists of a calender stack 30 for gap calendering a sheet 31 of the compounded rubber ingredients supplied at 32. The calendered sheet is deposited on a chain grate conveyor or moving mold. Guide roll 33 and driven roll 34 carrying a moving mold or chain apron 35 which has the mesh, wire thickness, spirals per foot, etc. desired to give the requisite textured surface, overall thickness and spacing of the bulges. The top portion of the chain apron passes between a series of steam heated platens 36, 37 and 38. The chain apron rides on the lower platens and the upper platens are spaced as closely as possible to the upper surface of the sheet on the chain apron to achieve good heat transfer but do not touch the rubber. As an example, the length of the entire range can be 50 feet, the chain width 4 feet 10 inches and the chain speed 10 feet/minute.

The heating carried out in the area indicated by platen 36 is sufficient to secure blowing of the rubber sheet 31 but is not sufficient to completely cure the rubber. In the preferred method, at approximately the midpoint of the range the non-woven fabric 20 is passed over guide rolls 39 and 40 and is brought into contact with the upper surface of the rubber sheet by roll 41. Passing over roll 41 is an endless heat resistant sheet 42, such as a stainless steel sheet or polytetrafluoroethylene coated woven glass sheet, with the latter being preferred because it is porous. Sheet 42 is placed on top of the non-woven and travels along with the laminated non-woven fabric and rubber sheets through the remainder of the platens helping the passage of the composite therethrough and applies the desired slight and resilient amount of pressure to bring the non-woven into contact with the rubber sheet. Sheet 42 is tensioned by tension rolls 43 and 44. While the non-woven, as indicated by broken lines 20a and roll 41a, can be brought into contact with the rubber at the beginning of the range before the rubber is blown, the non-woven fabric is preferably brought into contact with the rubber sheet at the point of roll 41 where the rubber sheet is semicured rather than at the beginning of the range because of the synthetic polymer content of the fabric. The fabric will degrade if exposed to excessive temperatures for too long a time. It is possible, however, to bring the non-woven fabric into contact at the beginning of the range, if suitable care is exercised. An additional disadvantage of doing this is that the fabric tends to impede heat transfer from the top platens which may cause nonuniform development of the blown rubber structure.

After sheet 42, the non-woven fabric 20, and the sponge rubber layer 31 have been brought into contact they pass through the remainder of the range under platens 38. The latex binder in the non-woven reaches a plastic state during this time and securely bonds to the rubber sheet. At the end of the range, the laminate separates from the chain apron by being conveyed over a roll 45 by sheet 42 and into an oven generally indicated at 46. Sheet 42 assists in the separating of the laminate from the chain apron. Final curing and degassing of the rubber layer is carried out in the oven. The laminated structure is carried in the initial portions of the oven by the sheet 42. The laminated structure is then separated from sheet 42 at roll 47, returned through the oven over a series of idler rolls 48 and removed from the oven at 49. It can then be passed over cooling cans, trimmed and rolled up.

It might be noted at this point that while the waste from trimming scrim-backed materials is worthless the waste from the trimming of the non-woven reinforced underlay of this invention can be digested and reused.

While the described method of bonding the non-woven to the rubber layer is preferred, other types of ranges can be used to accomplish this. For example, an oven heated by hot air can be used to blow the rubber, and at the point where the non-woven is introduced it can be brought into contact with the rubber over a suitable pressure roll and then held against the rubber sheet as it passes through the oven by means of hot air blasts against the surface of the non-woven.

It will be noted that because of the unique dimensional stability of the non-woven fabric and its inherent strength, the use of expander rolls, guides, tinter frames and other such equipment which are necessary in handling a woven fabric such as a scrim, is not necessary in this process and their elimination permits a much simpler operation to be realized.

Having thus described this invention, what is sought to be protected by Letters Patent is succinctly set forth in the following claims:

1. A multidirectional dimensionally stable carpet underlay comprising a smooth surface latex-saturated porous random non-woven fabric chemically bonded on the smooth surface side thereof to a sponge elastomer layer, the ratio of the strength of said fabric in one direction to the strength thereof in another direction being less than 5:1 and said fabric having a weight in the range of 1 to 9 ounces per square yard and consisting essentially of uniformly blended synthetic fibers and 7 to 25 weight percent thereof (dry basis) of a heat-fused thermoplastic binder, said fibers comprising at least 17 weight percent of crimped fibers having a denier per filament in the range of 3 to 30, a length in the range of 1 to 6 inches and a life of at least 100,000 cycles in accordance with the Flex Cycles to Failure of Fiber Test, said fibers on the smooth surface side thereof being partly fused and compacted but being free from any noticeable coalesence, and said sponge elastomer layer having a blown density in the range of 1 to 50 pounds per cubic foot, a multiplicity of formed bulges and contacting said fabric only on the face thereof between said bulges with the bond strength therebetween being greater than the internal cohesiveness of said elastomer.

2. The carpet underlay of claim 1 wherein said fibers having a denier per filament in the range of 3 to 30 consist of crimped polypropylene fibers with the remainder being viscose rayon fibers.

References Cited

UNITED STATES PATENTS

| | | | |
|---|---|---|---|
| 3,034,927 | 5/1962 | Fairclough et al. | 117—140 |
| 3,231,650 | 1/1966 | Findlay et al. | 264—128 |
| 3,255,061 | 6/1966 | Dobbs | 161—159 XR |
| 2,765,247 | 10/1956 | Graham | 161—155 X |

ROBERT F. BURNETT, Primary Examiner

R. L. MAY, Assistant Examiner

U.S. Cl. X.R.

161—123, 127, 151, 159